(12) United States Patent
Helle et al.

(10) Patent No.: US 8,466,661 B2
(45) Date of Patent: Jun. 18, 2013

(54) LOW-VOLTAGE HARMONIC FILTER FOR FULL-SCALE CONVERTER SYSTEMS

(75) Inventors: Lars Helle, Suldrup (DK); Philip Carne Kjaer, Aarhus C (DK); John Nieuwenhuizen, Horsens (DK); Morten Lindholm, Højbjerg (DK)

(73) Assignee: Vestas Wind Systems A/S, Aarhus N (DK)

( * ) Notice: Subject to any disclaimer, the term of this patent is extended or adjusted under 35 U.S.C. 154(b) by 881 days.

(21) Appl. No.: 12/558,893

(22) Filed: Sep. 14, 2009

(65) Prior Publication Data

US 2010/0118568 A1    May 13, 2010

Related U.S. Application Data

(60) Provisional application No. 61/096,366, filed on Sep. 12, 2008.

(30) Foreign Application Priority Data

Sep. 12, 2008   (EP) ...................................... 08164250

(51) Int. Cl.
   *H02P 9/00*        (2006.01)
(52) U.S. Cl.
   USPC ............................................. 322/44; 322/100
(58) Field of Classification Search
   USPC .............. 322/100, 7, 44, 93; 307/37, 83, 105, 307/7; 363/34
   See application file for complete search history.

(56) References Cited

U.S. PATENT DOCUMENTS

| | | | |
|---|---|---|---|
| 3,253,211 A * | 5/1966 | Worcester ....................... | 322/32 |
| 3,290,578 A | 12/1966 | Ainsworth | |
| 3,327,199 A * | 6/1967 | Gardner et al. ................. | 363/23 |
| 3,555,291 A | 1/1971 | Dewey | |
| 3,711,760 A | 1/1973 | Kaiser | |
| 3,825,815 A * | 7/1974 | Gyugyi et al. ................ | 307/105 |
| 4,308,575 A * | 12/1981 | Mase ............................... | 363/48 |
| 5,331,534 A * | 7/1994 | Suzuki et al. ................... | 363/20 |
| 5,481,450 A * | 1/1996 | Lee et al. .................... | 363/21.16 |
| 5,668,418 A * | 9/1997 | Carlsson et al. .............. | 307/105 |
| 5,999,428 A * | 12/1999 | Dahler et al. .................. | 363/71 |

(Continued)

FOREIGN PATENT DOCUMENTS

| | | |
|---|---|---|
| EP | 1467094 | 10/2004 |
| JP | 59032364 A | 2/1984 |
| JP | 07274529 A * | 10/1995 |

OTHER PUBLICATIONS

European Search Report dated Nov. 2, 2009.

*Primary Examiner* — Julio Gonzalez
(74) *Attorney, Agent, or Firm* — Patterson & Sheridan, LLP

(57) ABSTRACT

The present invention relates to a wind turbine facility comprising a power generator operationally connected to an AC/AC converter adapted to receive variable frequency AC-power from the power generator, and adapted to generate substantially fixed frequency AC-power. The wind turbine facility further comprises a harmonic filter system, and a grid transformer comprising a primary winding being operationally connected to the AC/AC converter, and a secondary winding adapted to be operationally connected to an associated, substantially fixed frequency AC-power supply grid. The grid transformer further comprises a tertiary winding being operationally connected to the harmonic filter in order to suppress unwanted harmonics, such as selected harmonics generated by the AC/AC converter. The turn ratio between the primary and tertiary windings is selected in such a manner that a voltage of the tertiary winding is lower than a nominal voltage level of the associated AC-power supply grid voltage.

18 Claims, 3 Drawing Sheets

U.S. PATENT DOCUMENTS

| | | | | |
|---|---|---|---|---|
| 6,111,762 A | * | 8/2000 | Igarashi et al. | 363/21.16 |
| 6,411,528 B1 | * | 6/2002 | Yasumura | 363/19 |
| 2003/0227172 A1 | | 12/2003 | Erdman et al. | |
| 2005/0012339 A1 | | 1/2005 | Mikhail et al. | |

* cited by examiner

LOW-VOLTAGE HARMONIC FILTER FOR FULL-SCALE CONVERTER SYSTEMS

PRIORITY CLAIM

Priority is claimed on the following applications: EP Application No.: 08164250.6, Filed on Sep. 12, 2008; and U.S. Application No. 61/096,366, Filed on Sep. 12, 2008, the content of which are incorporated here by reference.

FIELD OF THE INVENTION

The present invention relates to an arrangement for suppressing harmonics in a full-scale converter system. The arrangement according to the present invention involves connection of a filter, such as a tuned LC-filter or an active filter, to a tertiary winding of a grid transformer.

BACKGROUND OF THE INVENTION

U.S. Pat. No. 3,711,760 relates to a power supply system for supplying AC power to a DC load via a rectifier system.

In the power supply system suggested in U.S. Pat. No. 3,711,760 a three phase AC power source supplies AC power to two six phase transformers each having a primary, a secondary and a tertiary winding. The primary windings are directly connected to the AC power source. The secondary windings are operatively connected to a twelve phase rectifier which supplies the DC load with DC power. The windings of each of the two six phase transformers are arranged in such a manner that the fifth, seventh, seventeenth and nineteenth harmonics cancel each other.

The tertiary windings are connected to harmonic filters so that the eleventh, thirteenth, twenty-third and twenty-fifth harmonics are suppressed by said harmonic filters.

The power supply system of U.S. Pat. No. 3,711,760 is intended for supplying large amounts of DC power to a DC load.

Within the field of wind energy large amounts of AC power is to be delivered from individual wind turbines or wind turbine plants to AC distribution networks. Since wind turbines are often operated at variable speeds the frequency of the generated power varies in accordance with the variable frequency. For that reason AC/AC converters having an intermediate circuit are applied to keep the frequency of the AC power to be injected into an AC distribution network within the limits set by the grid codes of the particular network.

AC/AC converters of wind turbine systems generate unwanted voltage or current harmonics. These unwanted voltage or current harmonics should be prevented from reaching a power supply grid operatively connected to the wind turbine system. As step-up transformers are normally required between AC/AC converters and associated power supply grids, it is of interest to make use of the transformer reactance. It is well-known, cf. FIG. 1, to use a step-up transformer as a phase reactor and to apply tuned LC-branches on the high voltage side of the step-up transformer. This removes the need for the separate phase reactor, but has two disadvantages: (i) a dv/dt filter (which is physically small) must be inserted between AC/AC converter and step-up transformer, and (ii) the LC-branch is connected at high voltage level.

It may be seen as an object of embodiments of the present invention to provide a simple solution for suppressing harmonics in wind power systems.

It may be seen as a further object of embodiments of the present invention to provide a solution where harmonic suppression is performed at a low voltage level.

DESCRIPTION OF THE INVENTION

The above-mentioned objects are complied with by providing, in a first aspect, a wind turbine facility comprising
  a power generator adapted to convert mechanical energy to electric energy in the form of AC-power,
  an AC/AC converter adapted to receive variable frequency AC-power from the power generator, and adapted to generate substantially fixed frequency AC-power,
  a harmonic filter system, and
  a grid transformer comprising one or more primary windings being operationally connected to the AC/AC converter so as to receive substantially fixed frequency AC-power therefrom, the grid transformer further comprising one or more secondary windings adapted to be operationally connected to an associated, substantially fixed frequency AC-power supply grid, and
wherein the grid transformer further comprises one or more tertiary windings being operationally connected to the harmonic filter system in order to suppress unwanted harmonics, such as selected harmonics generated by the AC/AC converter, and wherein a turn ratio between a primary winding and a tertiary winding is selected in such a manner that a voltage of the tertiary winding is lower than a nominal voltage level of the associated AC-power supply grid voltage.

It should be noted that the term wind turbine facility should be interpreted broadly. Thus, the term wind turbine facility covers a single wind turbine or a group of wind turbines forming a wind turbine farm.

Similarly, the term unwanted harmonics should be interpreted broadly. Thus, the term unwanted harmonics covers any distortions to the electrical current and/or voltage flowing between the wind turbine facility and the associated, substantially fixed frequency AC-power supply grid.

As it will become clear from the following description the harmonic filter system may comprise a single harmonic filter or a plurality of harmonic filters for each phase of the wind turbine facility. For example, a single active filter may be applied for each phase. Alternatively or in combination therewith, a plurality of passive filters may be applied for each phase, each of said passive filters preferably being configured to suppress a selected harmonics. By nominal voltage level is meant the desired voltage level at which the AC-power supply grid is intended to operate. Typically the nominal voltage level of the AC-power supply grid voltage is between 10 kV and 36 kV.

Preferably, the power generator, the AC/AC converter, the harmonic filter system and the grid transformer are all configured to operate in a three-phase configuration. The power generator may deliver a three-phase AC output power voltage having a voltage level in the range 0.4-6 kV. Moreover, the power generator may be capable of generating and delivering AC power in a wide power range, i.e. from a few kW to several MW.

The power generator may be a synchronous generator applying external magnetisation or, alternatively, a synchronous generator applying permanent magnets for magnetisation. An induction generator may be applied as well. The wind turbine facility according to the present invention is preferably a so-called full-scale facility. This implies that all power generated by the power generator is passed through the AC/AC converter and the grid transformer.

The grid transformer may be configured to suppress selected harmonics by applying appropriate winding configurations. Thus, suppression of harmonics may be achieved by applying appropriate combinations of for example star, Y and delta configurations of the primary and/or secondary windings of the grid transformer.

The voltage(s) of one or more tertiary windings may be within the range 400-1000 V, such as within the range 600-990 V which is considerable less that the nominal voltage level of the secondary windings (10-36 kV). By operating the harmonic filter system at a relatively low voltage level its cost of manufacturing is reduced accordingly because the harmonic filter system may be implemented using passive components only. Moreover, the filter size may be reduced compared to an arrangement where a harmonic filter system is operated at a significantly higher voltage level.

When connecting wind turbine facilities to power supply grids, there is a risk of interaction in the form of harmonics or other resonances between the harmonic filter system of the wind turbine facility and the power supply grid. In PWM-based AC/AC converters operating with a fixed switching frequency, it is advantageous to use tuned LC-branches to suppress harmonics at or near the PWM frequency, rather than open C-branches. A tuned LC-branch will narrow the range of resonance frequencies between the capacitor of the LC-branch and the grid. Compared to open C-branches the phase reactor (on the converter phase output) is larger when using tuned LC-branches for the same harmonic filtering.

According to the present invention one or more tertiary windings on the transformer may be used for the LC-branch, the LC-branch comprising the harmonic filter system. In the case of a three-phase system a three-winding transformer must be used. This also implies that not all leakage reactance is placed between the AC/AC converter and LC-branch, unlike known high voltage solutions. Smaller reactance means that more capacitance is required in the LC-branch. However, a capacitance C is significantly smaller and less expensive than inductance, L. The amount of required reactance depends on transformer layout. However, the remaining transformer reactance (from the LC-branch and towards the power supply grid) reduces harmonics somewhat.

As indicated above, the harmonic filter system may comprise one or more passive electronic filters. Preferably, the harmonic filter system comprises one or more passive electronic filters operatively connected to each of the phases of the wind power facility. Thus, in the case of a three-phase power generator one or more passive electronic filters, such as for example tuned LC-filters, are provided for each phase. For each phase the respective input ends of the tuned LC-filters are operatively connected to the relevant tertiary winding of the of the grid transformer. The other ends of the filters are interconnected thereby forming a star connection.

Preferably, each passive electronic filter is implemented as a band-pass filter comprising a capacitor connected in series with an inductor and a resistor coupled in parallel. Each passive filter may be tuned to suppress selected harmonics, preferably harmonics being generated by the AC/AC converter. Examples of such harmonics are harmonics of the switch frequency applied by the AC/AC converter. Each passive electronic filter may be configured to suppress a selected harmonics, such as the eleventh, thirteenth, seventeenth, nineteenth, twenty-third and twenty-fifth harmonics.

Since passive filters are tuned filters they will suppress frequencies in a narrow frequency band. A plurality of tuned filters may advantageously be applied in order to suppress a plurality of harmonics including harmonics at or near the switch frequency.

The wind turbine facility according to the present invention may further comprise a dv/dt filter operationally connected to the AC/AC converter and the one or more primary windings of the grid transformer. A dv/dt filter may advantageously be applied in each phase from the AC/AC converter in order to protect the transformer windings.

As an alternative to passive filters, the harmonic filter system may be implemented using active filters. Active filters may be operated with a switch frequency significantly higher than the AC/AC converter. In this way an active filter may be controlled to suppress the harmonics that are not suppressed by a given configuration of the step-up transformer. For example, an active filter may be adapted, but not limited, to suppress harmonics such as the eleventh, thirteenth, twenty-third and twenty-fifth harmonics. The switch frequency of the active filters sets an upper limit to which harmonics that can be suppressed. Optionally, the active filter may be applied to suppress unbalanced voltages from the wind turbine facility. Such unbalanced voltages may originate from small manufacturing deviations between the respective phases of the wind turbine facility.

The AC/AC converter preferably comprises a DC intermediate circuit separating a rectifier and an inverter. Thus, the AC/AC converter may be operated as a frequency converter where the frequency of the AC power supplied by the AC/AC converter is independent of the frequency supplied by the power generator. A common-mode filter operationally connected to the DC intermediate circuit of the AC/AC converter may be provided.

Typically, the wind turbine facility includes components specifically involved in the generation of electrical power and components which are of a secondary nature, the latter being known as auxiliary components. Optionally the auxiliary components may be powered by the tertiary winding.

In a second aspect the present invention relates to an arrangement for suppressing unwanted electrical harmonics in a multi-phase wind turbine facility, the arrangement comprising for each phase a grid transformer comprising a primary winding, a secondary winding, and a tertiary winding, wherein a turn ratio between the primary and the tertiary winding is selected in such a manner that a voltage of the tertiary winding is lower than a nominal voltage level of the secondary winding, and a harmonic filter system being adapted to suppress at least one selected harmonic being generated by an associated AC/AC converter of the wind turbine facility.

In general the arrangement according to the second of the present invention may be implemented following the design routes provided in connection with the first aspect of the present invention.

Thus, the grid transformer is preferably configured to operate in a three-phase configuration. Moreover, a harmonic filter system is operatively connected to each tertiary winding of the grid transformer.

The harmonic filter system may comprise, for each phase, one or more passive electronic filters. Each of said passive electronic filters may comprise a tuned LC-filter, wherein each of said tuned LC-filter comprises a band-pass filter.

Alternatively, the harmonic filter system may comprise, for each phase, one or more active electronic filters. Each active filter may be configured to suppress a plurality of harmonics, such as the eleventh, thirteenth, seventeenth, nineteenth, twenty-third and twenty-fifth harmonics.

The arrangement may further comprise a dv/dt filter operationally connected to the associated AC/AC converter and one or more primary windings of the grid transformer. The associated AC/AC converter may be implemented as discussed in connection with the first aspect of the present invention.

Preferably, the voltage(s) of the one or more tertiary winding(s) is/are within the range 400-1000 V, such as within the range 600-990 V.

In a third aspect, the present invention relates to a method for suppressing unwanted electrical harmonics in a wind turbine facility, the method comprising the steps of providing a grid transformer comprising one or more primary windings, one or more secondary windings, and one or more tertiary windings, wherein a turn ratio between a primary winding and a tertiary winding is selected in such a manner that a voltage of the tertiary winding is lower than a nominal voltage level of a secondary winding, and providing an active filter system being operatively connected to at least one of the one or more tertiary windings of the grid transformer in order to suppress unwanted harmonics, such as selected harmonics generated by an associated AC/AC converter of the wind turbine facility.

Since most wind turbine facilities generate AC-power in three phases the grid transformer and the active filter system should be able to operate in a three-phase configuration. However, the method according to the third aspect of the present invention is not limited to three phase systems, and may thus be applied in single and other multiphase configurations.

The active filter system may be operated with a switch frequency significantly higher than the switch frequency of the associated AC/AC converter. Thus, the active filter system may be controlled to suppress harmonics that are not suppressed by a selected configuration of the grid transformer. The active filter system may be adapted, but not limited, to suppress harmonics such as the eleventh, thirteenth, seventeenth, nineteenth, twenty-third and twenty-fifth harmonics. However, it should be noted that the switch frequency of the active filter system sets an upper limit to the order of suppressible harmonics.

An advantage of applying active filters on the tertiary windings is that the filter can work with a higher switch frequency due to a lower voltage on filter.

In a fourth aspect, the present invention relates to a method for suppressing unwanted electrical harmonics in a wind turbine facility, the method comprising the steps of providing a grid transformer comprising one or more primary windings, one or more secondary windings, and one or more tertiary windings, wherein a turn ratio between a primary winding and a tertiary winding is selected in such a manner that a voltage of a tertiary winding is lower than a nominal voltage level of a secondary winding, and providing a harmonic filter system being operatively connected to at least one of the one or more tertiary windings of the grid transformer in order to suppress unwanted harmonics, such as selected harmonics generated by an associated AC/AC converter of the wind turbine facility.

Again, since most wind turbine facilities generate AC-power in three phases the grid transformer and the harmonic filter system should be able to operate in a three-phase configuration. However, the method according to the third aspect of the present invention is not limited to three phase systems, and may thus be applied in single and other multiphase configurations.

The harmonic filter system may be implemented as discussed in connection with the first and second aspects of the present invention, i.e. as a passive or an active filter. Thus, the harmonic filter system may be configured to, but not limited to, suppress the eleventh, thirteenth, seventeenth, nineteenth, twenty-third and twenty-fifth harmonics.

In a fifth aspect, the present invention relates to a method for suppressing unwanted electrical harmonics in a multiphase wind turbine facility, the method comprising the steps of providing a grid transformer, said grid transformer comprising for each phase
a primary winding, a secondary winding, and a tertiary winding, wherein a turn ratio between the primary and tertiary windings is selected in such a manner that a voltage of the tertiary winding is lower than a nominal voltage level of the secondary winding,
and
providing, for each phase, one or more harmonic filters, each harmonic filter being adapted to suppress at least one selected harmonics, said selected harmonics being generated by an AC/AC converter of the wind turbine facility.

Preferably, the wind turbine facility, including the grid transformer, generates AC-power in three phases. However, the method according to the fifth aspect of the present invention is not limited to three phase systems, and may thus be applied in other multiphase configurations.

The harmonic filters may be implemented as discussed in connection with the first and second aspects of the present invention, i.e. as passive or active filters. Thus, the harmonic filters may be configured to, but not limited to, suppress the eleventh, thirteenth, seventeenth, nineteenth, twenty-third and twenty-fifth harmonics.

BRIEF DESCRIPTION OF THE DRAWINGS

The present invention will now be explained in further details with reference to the accompanying figures, wherein.

While the invention is susceptible to various modifications and alternative forms, specific embodiments have been shown by way of example in the figures and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

Figure 1:
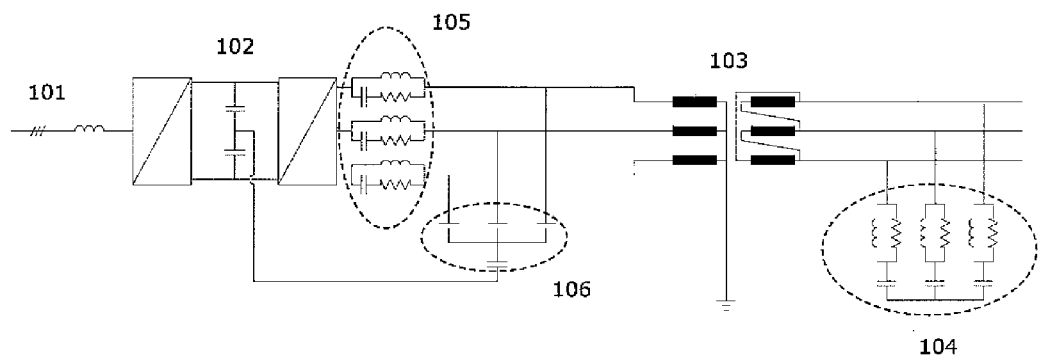
FIG. 1 shows a prior art power supply system having harmonic filters connected to the high-voltage side of a step-up transformer.

FIG. 1 shows a full-scale power system applying a prior art solution for suppressing harmonics. As seen in FIG. 1 a three-phase supply line 101 provides AC power to a full-scale AC/AC converter 102 which is operatively connected to a grid transformer 103, the latter typically being a step-up transformer. Passive tuned harmonic filters 104 are connected to the power lines. Moreover, dv/dt filters 105 and common-mode filters 106 are provided. The power lines typically supply voltages in the range 10-36 kV. It is a disadvantage of the prior art system shown in FIG. 1 that the harmonic filters 104 must be dimensioned to operate at this relatively high voltage level.

Figure 2:
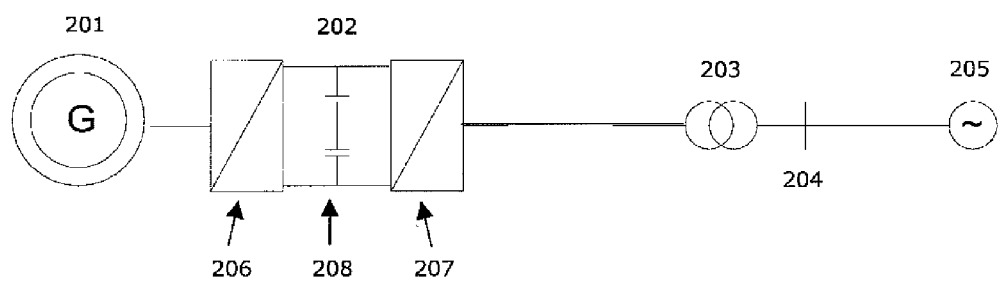
FIG. 2 shows wind power supply system.

In FIG. 2 a full-scale wind power system is depicted. A seen in FIG. 2 the system comprises a power generator 201, a full-scale AC/AC converter 202, a grid transformer 203 and a set of terminals 204 interconnecting the wind power system and an associated power supply grid 205. The power generator 201 is configured to be operated at variable speeds and for that reason the full-scale AC/AC converter 202 is operated as a frequency converter comprising a rectifier 206 and an inverter 207 separated by a DC intermediate circuit 208. The rectifier 206 and the inverter 207 may involve traditional bridge rectifier/inverter configurations.

In the full-scale system depicted in FIG. 2 all power generated by the power generator 201 is passed through the full-scale converter 202. The frequency of the AC-power supplied to the rectifier 206 varies with the speed of rotation of a rotor (not shown) of the power generator 201. However, the AC-power delivered to the associated power supply grid 205 must have a frequency that substantially matches the frequency of the associated power supply grid. This is accomplished by selecting an appropriate switch frequency of the inverter 207 so that the fundamental frequency of the voltage output of the inverter 207 matches the nominal frequency of the power supply grid 205.

The power generator 201 can be a synchronous generator applying external magnetisation or, alternatively, a synchronous generator applying permanent magnets for magnetisation. Alternatively, an induction generator can be applied.

Figure 3:
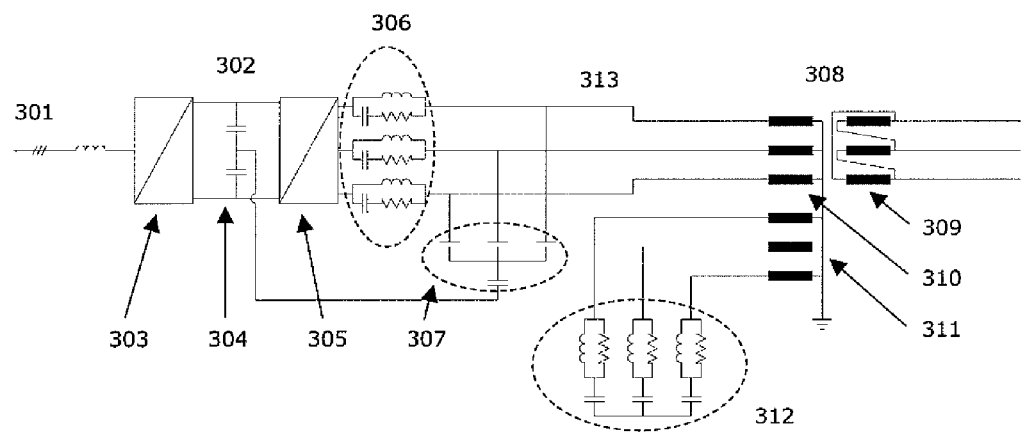
FIG. 3 shows a harmonic filter operatively connected to low-voltage tertiary winding of a grid transformer.

FIG. 3 shows an embodiment of the present invention. As seen in FIG. 3 a three phase power line 301 feeds an AC/AC converter 302, the AC/AC converter comprising a rectifier 303, a DC intermediate circuit 304 and an inverter 305. The inverter 305 is operatively connected to three primary windings 310 of a grid transformer 308 via an optional dv/dt filter arrangement 306. A common-mode filter arrangement 307 is inserted between the three phases 313 and the DC intermediate circuit 304.

The primary windings 310 of the grid transformer 308 are connected in a star connection. The grid transformer 308 further comprises three secondary windings 309 connected in a delta connection. Moreover, three tertiary windings 311 connected in a star connection are provided.

The voltage level on the primary side of the grid transformer 308 is typically within the range 0.4-6 kV whereas the voltage level on the secondary side of the grid transformer may typically be in the 10-36 kV. The voltage level of each of the tertiary windings is typically below 1 kV.

The grid transformer can be configured to suppress selected harmonics. For example, if the grid transformer is configured in a star/delta configuration harmonics fulfilling the formula 6n±1, where n is a positive integer, are suppressed. Other transformer configurations eliminate other harmonics.

Each of the three tertiary windings 311 are connected to one or more tuned LC-filters 312 in order to suppress selected harmonics, i.e. harmonics not being suppressed by the grid transformer itself. A majority of the harmonics to be suppressed by the tuned LC-filters 312 are switch harmonics generated by the inverter 305. In case the inverter 305 of the AC/AC converter 302 switches with a frequency of for example 5 kHz, and the grid frequency is 50 Hz, harmonics will be generated at 4950 Hz and 5050 Hz. In order to suppress these harmonics at least two tuned LC-filters are required for each phase. One of the filters is tuned to suppress the 4950 Hz harmonic, whereas another filter is tuned to suppress the 5050 Hz harmonic. Thus, a tuned LC-filter is preferably provided for each harmonic to be suppressed in each phase.

The composition of filters is preferably identical for all phases. Thus, if one phase is equipped with first and second tuned LC-filters for suppressing the 4950 Hz and the 5050 Hz harmonics, respectively, the remaining phases are preferably equipped with identical filters.

As stated above the filters for suppressing harmonics may be implemented as active filters. Preferably, the active filters are operated with a switch frequency significantly higher than the switch frequency of the AC/AC converter. The active filters can be configured to suppress harmonics, such as the eleventh, the thirteenth or other harmonics fulfilling the formula 6n±1, where n is a positive integer. The active filters may be implemented as voltage-source converters.

The invention claimed is:

1. A wind turbine facility comprising a power generator adapted to convert mechanical energy to electric energy in the form of AC-power,
    an AC/AC converter adapted to receive variable frequency AC-power from the power generator, and adapted to generate substantially fixed frequency AC-power,
    a harmonic filter system, and
    a grid transformer comprising one or more primary windings being operationally connected to the AC/AC converter so as to receive substantially fixed frequency AC-power therefrom, the grid transformer further comprising one or more secondary windings adapted to be operationally connected to an associated, substantially fixed frequency AC-power supply grid,
    wherein the grid transformer further comprises at least one tertiary winding being operationally connected to the harmonic filter system in order to suppress unwanted harmonics generated by the AC/AC converter, and wherein a turn ratio between a primary winding and the tertiary winding is selected such that a voltage of the tertiary winding is lower than a nominal voltage level of the associated AC-power supply grid voltage, wherein the voltage of the tertiary winding is less than or equal to 1000V.

2. The wind turbine facility according to claim 1, wherein the power generator, the AC/AC converter, the harmonic filter system and the grid transformer are configured to operate in a three-phase configuration.

3. The wind turbine facility according to claim 1, wherein the voltage of the tertiary winding is within the range of 400-1000 V.

4. The wind turbine facility according to claim 3, wherein the voltage of the tertiary winding is within the range of 600-990 V.

5. The wind turbine facility according to claim 1, wherein the harmonic filter system comprises one or more passive electronic filters.

6. The wind turbine facility according to claim 5, wherein each of the passive electronic filters comprises a tuned LC-filter, wherein each of said tuned LC-filter comprises a band-pass filter.

7. The wind turbine facility according to claim 1, wherein the harmonic filter system comprises one or more active electronic filters.

8. The wind turbine facility according to claim 1, wherein the harmonic filter system is configured to suppress a plurality of harmonics.

9. The wind turbine facility according to claim 8, wherein the harmonic filter system is configured to suppress the eleventh, thirteenth, seventeenth, nineteenth, twenty-third and twenty-fifth harmonics.

10. A system for suppressing unwanted electrical harmonics in a multi-phase wind turbine facility, the system comprising:

a grid transformer comprising a primary winding, a secondary winding, and a tertiary winding, wherein a turn ratio between the primary winding and the tertiary winding is selected such that a voltage of the tertiary winding is lower than a nominal voltage level of the secondary winding, and wherein the voltage of the tertiary winding is less than or equal to 1000V, and a harmonic filter system coupled to the tertiary winding, the harmonic filter system being adapted to suppress at least one selected harmonic being generated by an associated AC/AC converter of the wind turbine facility.

11. The system according to claim 10, wherein the grid transformer is configured to operate in a three-phase configuration, and at least one harmonic filter system is operatively connected to each tertiary winding of the grid transformer.

12. The system according to claim 10, wherein the voltage of the tertiary winding is within the range of 400-1000 V.

13. The system according to claim 12, wherein the voltage of the tertiary winding is within the range of 600-990 V.

14. The system according to claim 10, wherein the harmonic filter system comprises one or more passive electronic filters, wherein each of the passive electronic filters comprises a tuned LC-filter comprising a band-pass filter.

15. The system according to claim 10, wherein the harmonic filter system comprises one or more active electronic filters, the harmonic filter system being configured to suppress a plurality of harmonics.

16. The system according to claim 15, wherein the harmonic filter system comprises one or more active electronic filters, the harmonic filter system being configured to suppress the eleventh, thirteenth, seventeenth, nineteenth, twenty-third and twenty-fifth harmonics.

17. A method for suppressing unwanted electrical harmonics in a wind turbine facility, the method comprising:

providing a grid transformer comprising at least one primary winding, at least one secondary winding, and at least one tertiary winding, wherein a turn ratio between the primary winding and the tertiary winding is selected such that a voltage of the tertiary winding is lower than a nominal voltage level of the secondary winding, and wherein the voltage of the tertiary winding is less than or equal to 1000V, and providing a harmonic filter system being operatively connected to at the tertiary winding of the grid transformer in order to suppress unwanted harmonics generated by an associated AC/AC converter of the wind turbine facility.

18. A method for suppressing unwanted electrical harmonics in a multi-phase wind turbine facility, the method comprising:

providing a grid transformer, said grid transformer comprising for each phase:

a primary winding, a secondary winding, and a tertiary winding, wherein a turn ratio between the primary windings and the tertiary windings is selected such that a voltage of the tertiary windings is lower than a nominal voltage level of the secondary windings, and wherein the voltage of the tertiary winding is less than or equal to 1000V, and providing, for each phase, one or more harmonic filters coupled to a respective tertiary winding, each harmonic filter being adapted to suppress at least one selected harmonics being generated by an AC/AC converter of the wind turbine facility.

* * * * *